United States Patent
Bolz

(10) Patent No.: US 10,607,390 B2
(45) Date of Patent: Mar. 31, 2020

(54) TECHNIQUES FOR TILING COMPUTE WORK WITH GRAPHICS WORK

(71) Applicant: Nvidia Corporation, Santa Clara, CA (US)

(72) Inventor: Jeffrey A. Bolz, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 82 days.

(21) Appl. No.: 15/378,049

(22) Filed: Dec. 14, 2016

(65) Prior Publication Data

US 2018/0165787 A1    Jun. 14, 2018

(51) Int. Cl.
*G06T 15/00* (2011.01)
*G06T 15/80* (2011.01)

(52) U.S. Cl.
CPC ............ *G06T 15/005* (2013.01); *G06T 15/80* (2013.01)

(58) Field of Classification Search
CPC .......... G06T 1/20; G06T 1/60; G06T 15/005; G06T 15/80
USPC .................................. 345/426, 530, 544, 557
See application file for complete search history.

(56) References Cited

U.S. PATENT DOCUMENTS

| | | | | |
|---|---|---|---|---|
| 8,159,491 B2 * | 4/2012 | Capewell | ............... | G06T 15/005 345/426 |
| 8,174,531 B1 * | 5/2012 | Lindholm | ............. | G06T 15/005 345/502 |
| 2004/0012563 A1 * | 1/2004 | Papakipos | ................. | G06T 1/20 345/157 |
| 2008/0028152 A1 * | 1/2008 | Du | ........................ | G06F 9/3802 711/129 |
| 2009/0136142 A1 * | 5/2009 | Kosaraju | ............. | G06F 17/3028 382/232 |
| 2014/0118347 A1 * | 5/2014 | Hakura | ...................... | G06F 9/44 345/422 |
| 2014/0118379 A1 * | 5/2014 | Hakura | ..................... | G06T 1/60 345/557 |
| 2014/0118393 A1 * | 5/2014 | Hakura | ................... | G06T 17/20 345/628 |
| 2014/0152650 A1 * | 6/2014 | Son | ........................... | G06T 1/60 345/419 |
| 2014/0237187 A1 * | 8/2014 | Dimitrov | ............ | G06F 12/0897 711/122 |
| 2014/0267355 A1 * | 9/2014 | Kilgariff | ............... | G06T 11/001 345/589 |
| 2014/0285500 A1 * | 9/2014 | Lindholm | ................. | G06T 1/20 345/506 |
| 2015/0187117 A1 * | 7/2015 | Balci | ..................... | G06T 15/005 345/522 |
| 2015/0193907 A1 * | 7/2015 | Agarwal | .................. | G06T 1/60 345/557 |

(Continued)

*Primary Examiner* — Jacinta M Crawford
(74) *Attorney, Agent, or Firm* — Artegis Law Group, LLP

(57) ABSTRACT

A device driver is configured to identify a group of compute shaders to be executed in multiple traversals of a graphics processing pipeline. Each such compute shader accesses a compute tile of data having particular dimensions. The device driver interoperates with a tiling unit to determines dimension for a cache tile so that an integer multiple of each compute tile will fit evenly within the cache tile. Thus, when executing compute shaders in different traversals of the graphics processing pipeline, the data processed by those compute shaders can be cached in the cache tile between passes.

25 Claims, 14 Drawing Sheets

(56) References Cited

U.S. PATENT DOCUMENTS

| | | | |
|---|---|---|---|
| 2015/0213638 A1* | 7/2015 | Dimitrov | G06T 15/005 345/619 |
| 2015/0302545 A1* | 10/2015 | Harris | G06T 1/20 345/501 |
| 2017/0161863 A1* | 6/2017 | Baral | G06T 1/60 |

* cited by examiner

TECHNIQUES FOR TILING COMPUTE WORK WITH GRAPHICS WORK

BACKGROUND OF THE INVENTION

Field of the Invention

Embodiments of the present invention relate generally to graphics processing and, more particularly, to techniques for tiling compute work with graphics work.

Description of the Related Art

A conventional graphics processing unit (GPU) may be configured to implement a technique known as "tiled caching." According to this technique, the screen space is divided into different regions, where each region is associated with a different cache tile. A given cache tile includes data that can be processed to render the pixels within the screen region corresponding to the cache tile. Tiled caching may improve GPU performance when rendering a given screen region because some or all of the data needed to render that region is cached on-chip within the corresponding cache tile. Thus, once the cache tile is loaded into the cache, the GPU may avoid accessing off-chip data when rendering the screen region corresponding to the cache tile.

Some GPUs may also be configured to implement a technique known as "multi-pass rendering." Multi-pass rendering generally involves performing multiple passes through a graphics processing pipeline to render pixels for a given screen region. In each pass, data constituting either input or output data is written to one or more render targets. For example, in a first pass, the graphics processing pipeline could write various attributes to a first render target. Then, in a second pass, the graphics processing pipeline would read those attributes from the first render target, process those attributes, and generate pixels. The pixels would then be written to a second render target. In this example, the first render target could be a G-buffer, while the second render target could be a frame buffer.

Under some circumstances, tiled caching can be implemented in conjunction with the different rendering passes associated with multi-pass rendering. Returning to the above example, suppose the first render target and the second render target have a 1:1 correspondence between pixels, meaning that each pixel in the second render target depends only on the same pixel location in the first render target. In such a scenario, the graphics processing pipeline could create a cache tile that includes the first render target generated in the first pass. Then, when executing the second pass, the graphics processing pipeline need only access the on-chip data from the first render target within the cache tile to render pixels for the second render target. Thus, in the second pass, off-chip memory access operations may be avoided.

Under other circumstances, however, tiled caching cannot be performed across passes, and, consequently, memory bandwidth cannot be conserved in the manner described above. For example, if render targets associated with different passes do not have a 1:1 correspondence between pixels, then the data associated with one pass may not be sufficient to perform additional passes. Thus, the graphics processing pipeline would need to perform separate off-chip memory access operations to acquire the additional data needed for the additional passes. Because off-chip memory access operations can result in a substantial bandwidth penalty, performing multiple passes without being able to implement tiled caching can severely limit system performance.

The circumstance described above may arise when one pass involves pixel shader operations, and a subsequent pass involves compute shader operations where the compute shader is configured to access data that is associated with more than one pixel location per pixel. For example, in a first pass, the pixel shader could obtain attributes and other pixel-related data for rendering a set of pixels and then write those attributes to a first render target. Then, in a second pass, the compute shader could perform various operations with the attributes stored in the first render target to render the set of pixels to a second render target. However, in this example, when performing the operations related to a particular pixel, the compute shader may have to access attribute data from the first render target neighboring the location associated with that particular pixel. Specifically, when a pixel being processed in this manner resides on the boundary of a cache tile in the first render target, some of the neighboring attribute data needed by the compute shader would not be included in the cache tile for the first render target. Consequently, the graphics processing pipeline would need to perform one or more off-chip memory access operations for each boundary pixel to acquire the needed data. Here, the first and second render targets do not have a 1:1 correspondence between pixels, because multiple pixel locations from the first render target correspond to each individual pixel in the second render target.

As a general matter, numerous circumstances may arise in multi-pass rendering that conspire to prevent tiled caching from being implemented, including the circumstances outlined in the above example. Again, without tiled caching, multi-pass rendering operations may consume substantial memory bandwidth, thereby causing graphics processing throughput to fall below acceptable levels.

As the foregoing illustrates, what is needed is an approach to performing tiled caching in conjunction with multi-pass rendering for a wider range of scenarios.

SUMMARY OF THE INVENTION

One embodiment of the present invention sets forth a non-transitory computer-readable medium storing program instructions that, when executed by a processor, cause the processor to generate cache tiles by performing the steps of receiving a first dimension associated with a first compute tile that represents a first region of memory to be accessed by a first shader program during execution, and causing a tiler to assign dimensions to a first cache tile based on the first dimension, wherein the first cache tile resides within an on-chip cache memory and stores data associated with the first region of memory.

At least one advantage of the disclosed technique is that it allows tiled caching to be implemented in the context of multi-pass rendering. Accordingly, the need to perform off-chip memory access operations between traversals of the graphics processing pipeline can be reduced, which may improve memory bandwidth utilization and increase overall system performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
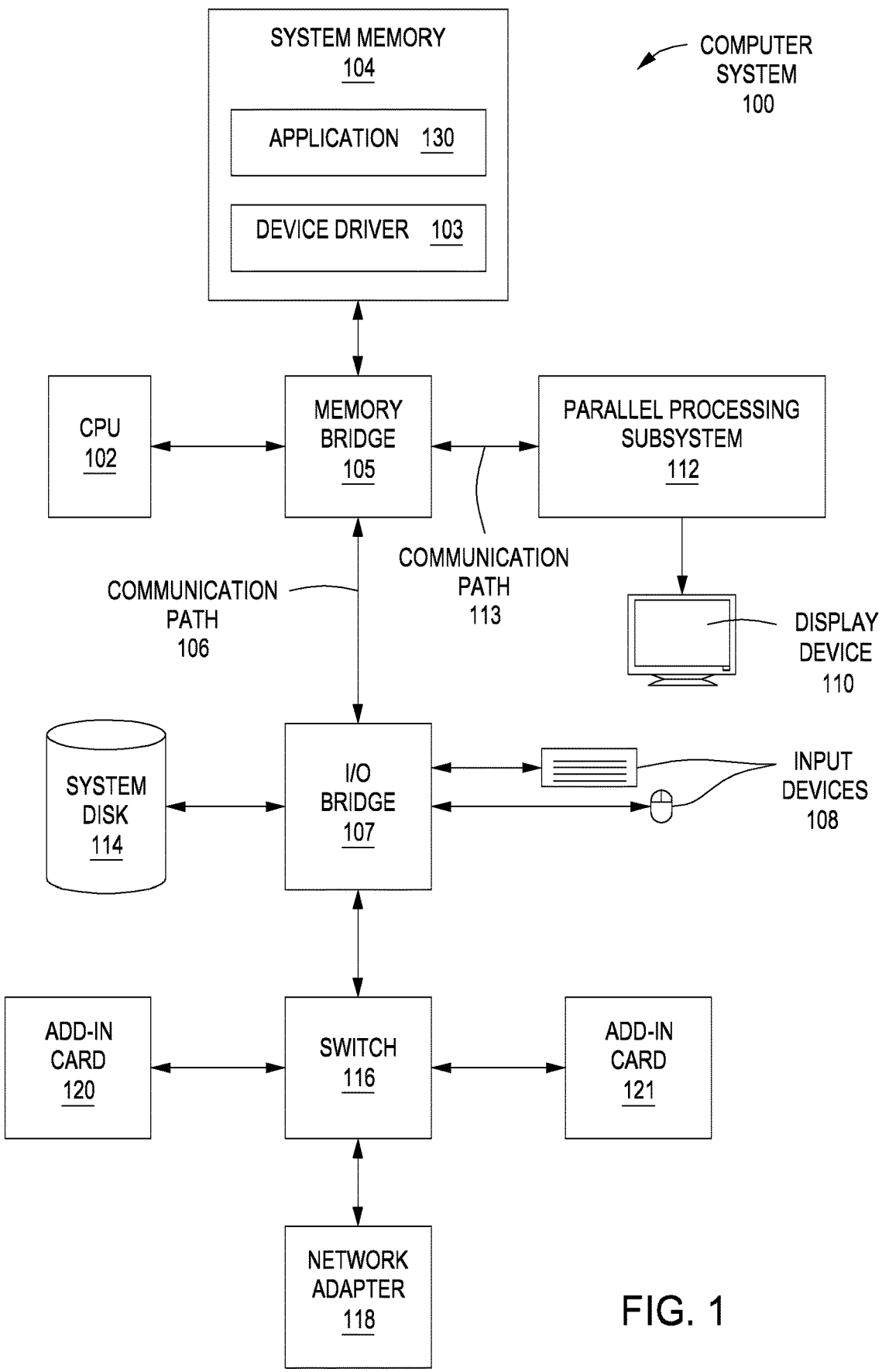
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112 and an application 130, both discussed in greater detail below in conjunction with FIGS. 5A-9.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
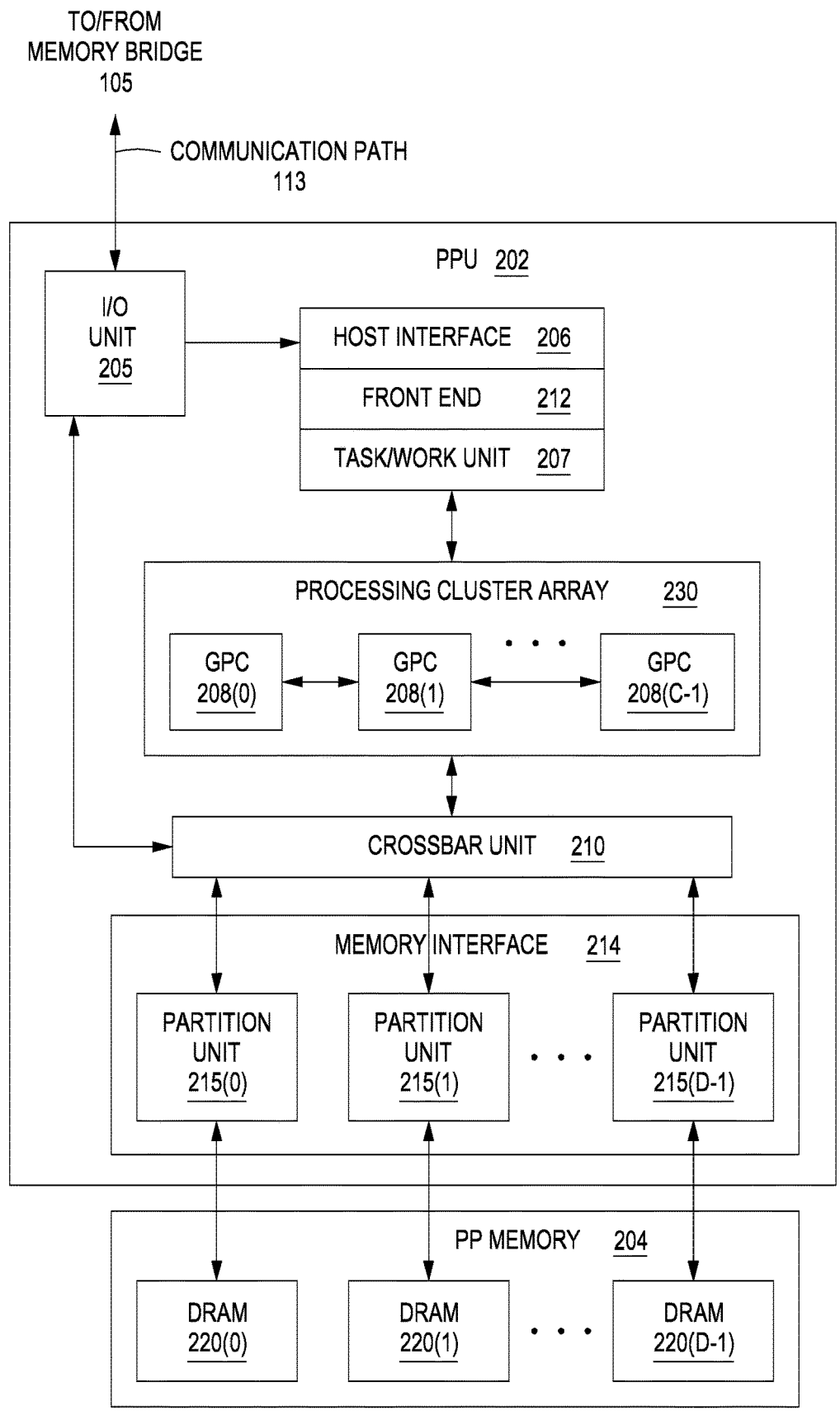
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
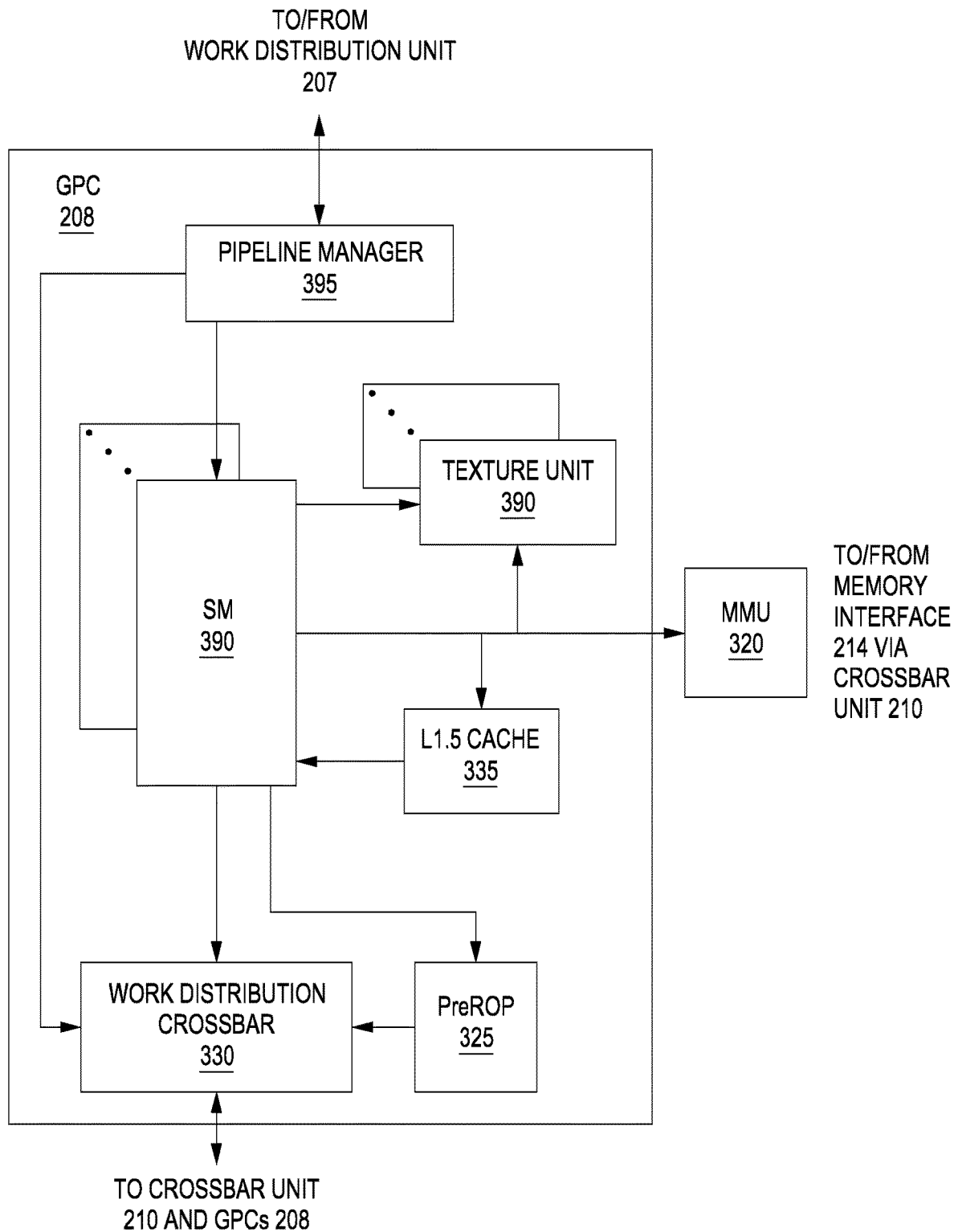
FIG. 3A is a block diagram of a general processing cluster included in the parallel processing unit of FIG. 2, according to various embodiments of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
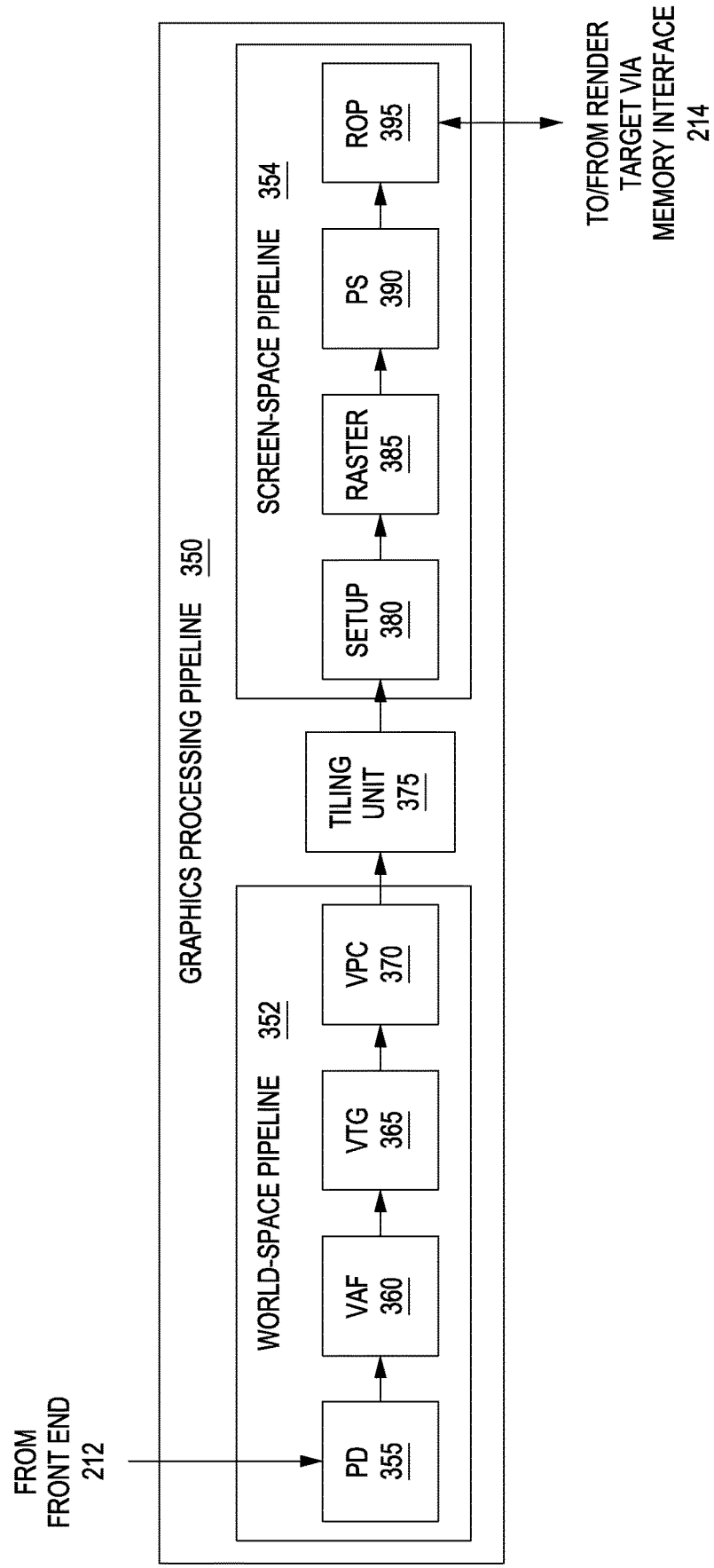
FIG. 3B is a conceptual illustration of a graphics processing pipeline that may be implemented within the parallel processing unit of FIG. 2, according to various embodiments of the present invention.

FIG. 3B is a conceptual illustration of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375 (tiler), a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may be implemented as software or hardware constructs and may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

As used herein, references to shared memory may include any one or more technically feasible memories, including, without limitation, a local memory shared by one or more SMs 310, or a memory accessible via the memory interface 214, such as a cache memory, parallel processing memory 204, or system memory 104. As also used herein, references to cache memory may include any one or more technically feasible memories, including, without limitation, an L1 cache, an L1.5 cache, and the L2 caches.

Tiled Caching

Figure 4:
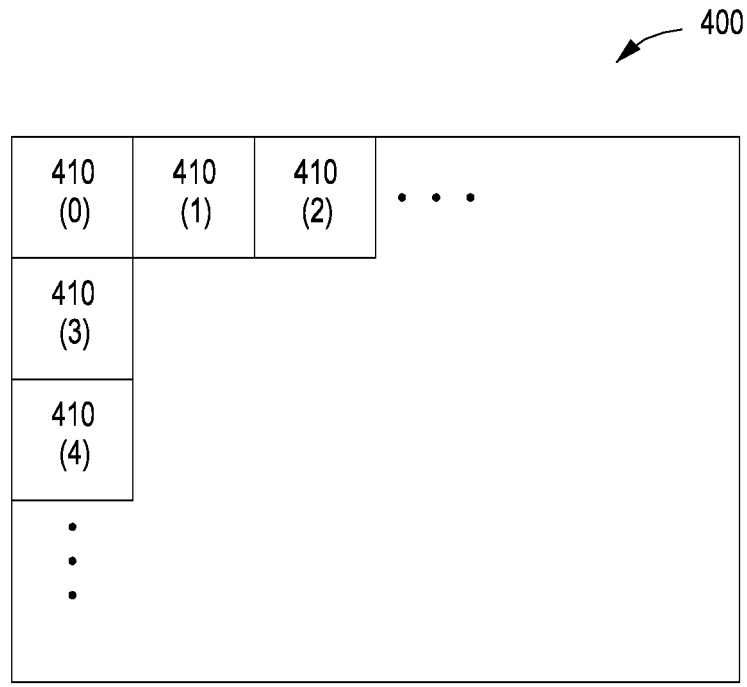
FIG. 4 is a conceptual illustration of a cache tile that the graphics processing pipeline of FIG. 3B may be configured to generate and process, according to various embodiments of the present invention.
Figure 4:
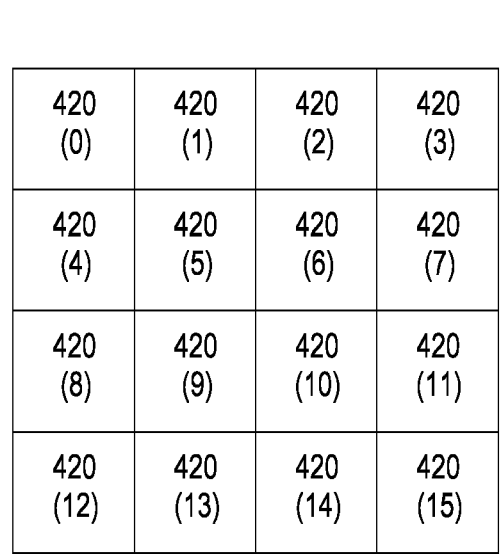

FIG. 4 is a conceptual illustration of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Tiling Compute Work with Graphics Work

Figure 5A:
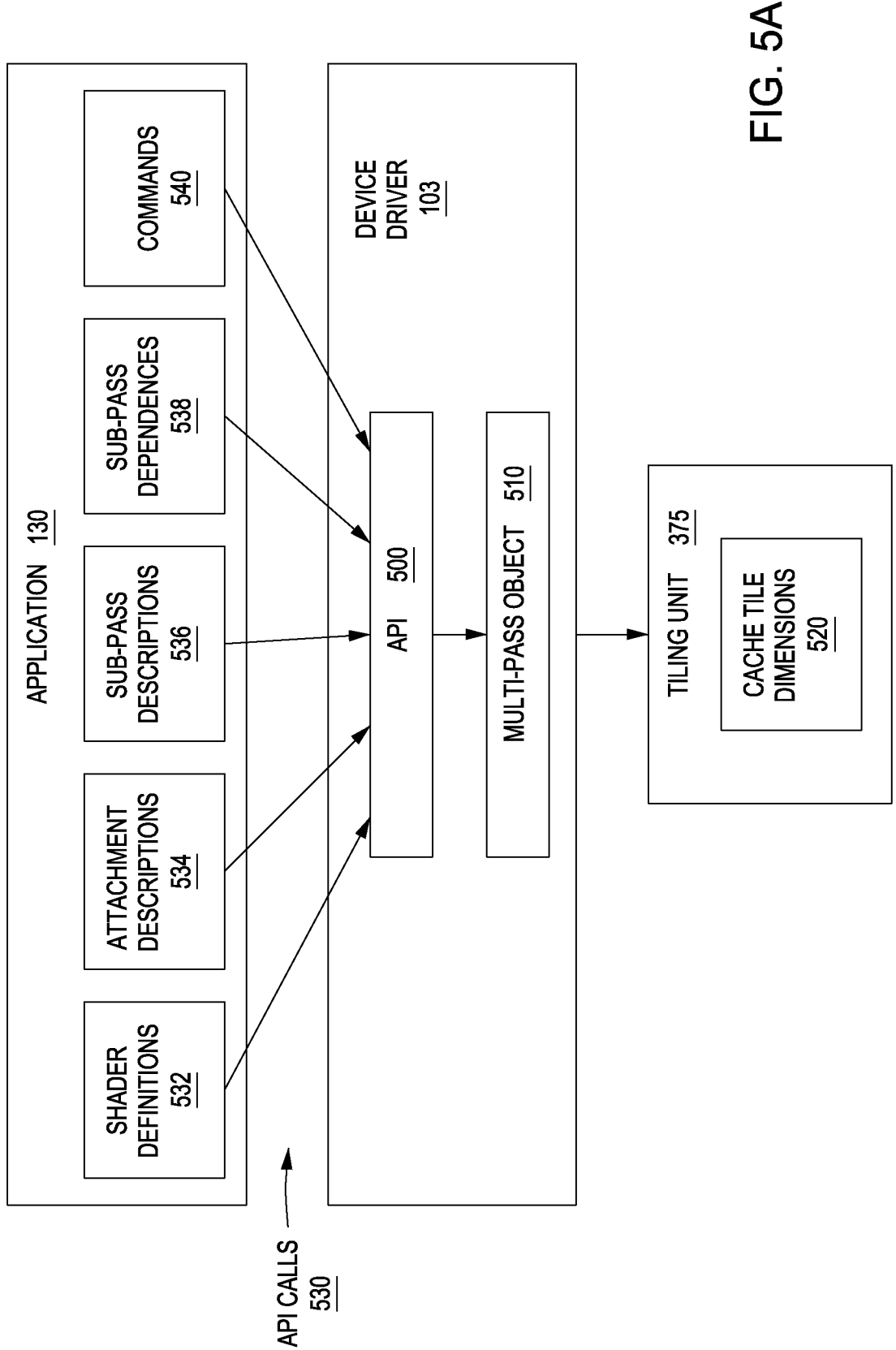
FIG. 5A illustrates the device driver of FIG. 1 generating a multi-pass object for use in dimensioning one or more cache tiles, according to various embodiments of the present invention.

FIG. 5A illustrates the device driver of FIG. 1 generating a multi-pass object for use in dimensioning one or more cache tiles, according to various embodiments of the present invention. As shown, device driver 103 of FIG. 1 includes an application programming interface (API) 500 and a multi-pass object 510. Application 130 is configured to interact with device driver 103 via API calls 530 made to API 500.

Application 130 is a software application that can be executed by CPU 102 to generate graphics for display. For example, application 130 could be a video game application that, when executed by CPU 102, generates a three-dimensional graphical environment. Application 130 interoperates with device driver 103, via API 500, in order to offload graphics rendering and general processing operations onto one or more PPUs 202 of FIG. 2. In doing so, application 130 provides specific data to device driver 103, via API 500, which device driver 103 then uses to configure graphics processing pipeline 350 for graphics and/or compute-oriented operations. That data includes, as is shown, shader definitions 532, attachment descriptions 534, sub-pass descriptions 536, sub-pass dependencies 538, and commands 540.

Shader definitions 532 generally include shader code corresponding to pixel shaders and/or compute shaders. Attachment descriptions 534 specify various attachments (color, depth/stencil, and so forth) and associated data, including the attachment format(s) and number of samples. Sub-pass descriptions 536 include data corresponding to specific "sub-passes," described in greater detail below in conjunction with FIG. 5B. In this disclosure, a "sub-pass" involves the execution of one or more processing stages of either, or both, of the pipelines within graphics processing pipeline 350. Each sub-pass description 536 indicates specific render targets to be used in the corresponding sub-pass, among other things. Sub-pass dependencies 538 represent memory and execution dependencies between sub-passes described in sub-pass descriptions 536. Commands 540 include various commands associated with each of those different sub-passes and/or API calls.

Device driver 103 is configured to receive the above-described data from application 130 and to then generate multi-pass object 510 based on that data. After generating multi-pass object 510, device driver 103 also records certain commands 540 received via API calls 530 into command buffers to be executed during each sub-pass. Device driver 103 may also create frame buffers and generate pipeline objects in response to API calls 530. In generating a pipeline object for a given sub-pass, device driver 103 compiles generic shader code included in shader definitions 532 into hardware-specific microcode associated with PPU 202, and then stores that microcode into PPU memory for later execution.

Multi-pass object 510 includes data that is used for performing a sequence of sub-passes. In this disclosure, a sequence of sub-passes may be referred to as a "multi-pass." In performing a multi-pass, device driver 103 generates graphics for display. When generating multi-pass object 510, device driver 103 also interoperates with tiling unit 375 in order to compute cache tile dimensions 520. Cache tile dimensions 520 set forth specific height and width values for cache tiles that allow data associated with some or all compute shaders defined in shader definitions 532 to be cached across multiple sub-passes.

When a compute shader is executed during a sub-pass, the compute shader may read and/or write certain data associated with a square or rectangular region of memory that corresponds to a square or rectangular region of screen space. For example, a given compute shader could read a 4×4 array of pixel data from memory and then render a 4×4 array of pixels. In doing so, the compute shader could read the 4×4 array of pixel data from one render target, and then render the 4×4 array of pixels to another render target. The region of memory read may be larger than the region of memory written. For example, the compute shader could read a 6×6 array of pixel data from memory, and then render a 4×4 array of pixels. These types of compute shaders may be implemented to perform blur operations, among other possibilities. Each sub-pass description 536 includes specific data that represents the size and dimension of data to be read and written during execution of the associated compute shaders, as described in greater detail below in conjunction with FIG. 5B.

Figure 5B:
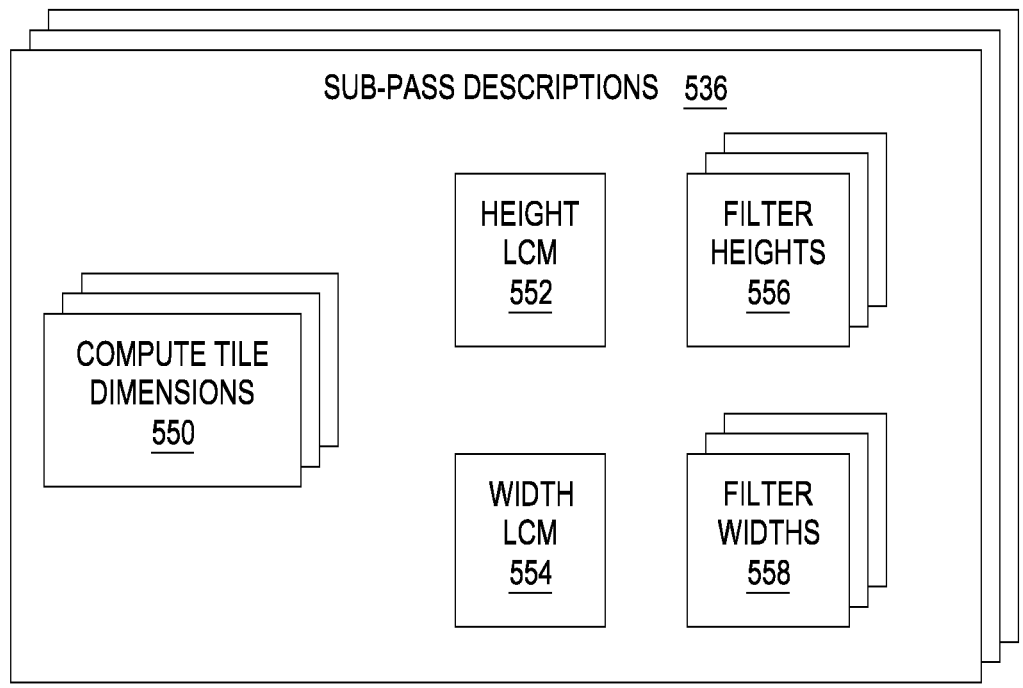
FIG. 5B illustrates an exemplary sub-pass description according to which the multi-pass object of FIG. 5A is generated, according to various embodiments of the present invention.

FIG. 5B illustrates an exemplary sub-pass description according to which the multi-pass object of FIG. 5A is generated, according to various embodiments of the present invention. As shown, sub-pass description 536 includes compute tile dimensions, height least common multiple (LCM) 532, width LCM 554, filter heights 556, and filter widths 558. The specific region of memory that is written during the execution of a particular compute shader is referred to herein as a "compute tile." Compute tile dimensions 550 include the compute tile dimensions for each compute shader associated with sub-pass description 536. For example, a compute shader could be associated with a 12×16 compute tile, meaning that execution of the compute tile involves writing to a 12×16 block of pixels in memory, and compute tile dimensions 550 would include these particular dimensions for that compute shader. Each compute shader may also be associated with a "filter width" value and a "filter height" value that indicates an additional region of data, outside the compute tile, that the compute shader reads during execution. Filter height and filter width data may be stored within filter heights 556 and filter widths 558. In some embodiments, sub-pass description 536 need not include compute tile dimensions 550, because tiling unit 375 may generate cache tile dimensions 520 based on the different LCMs included in sub-pass description 536. Also, in some embodiments, sub-pass description 536 need not include more than one filter width and filter height. An exemplary compute tile, along with an exemplary depiction of filter height and width, is described in conjunction with FIGS. 6A-6B.

Sub-pass description 536 also includes height LCM 552 and width LCM 554. Height LCM 552 represents the LCM of the height dimension of all compute tiles associated with the sub-pass. Width LCM 554 represents the LCM of the width dimension of all compute tiles associated with the sub-pass. Device driver 103 is configured to use the various LCM data included in each sub-pass description 536 associated with multi-pass object 510 in order to dimension cache tiles for use in the multi-pass. The usage of the LCM data shown in FIG. 5B is described in greater detail below in conjunction with FIGS. 6A-7B.

Referring generally to FIGS. 5A-5B, when a compute shader is executed during a sub-pass, an SM 310 generally launches an array of threads, referred to herein as a "work group," which operates on the associated compute tile. The correspondence between compute shaders, work groups, and compute tiles is described in greater detail below in conjunction with FIG. 6A.

Figure 6A:
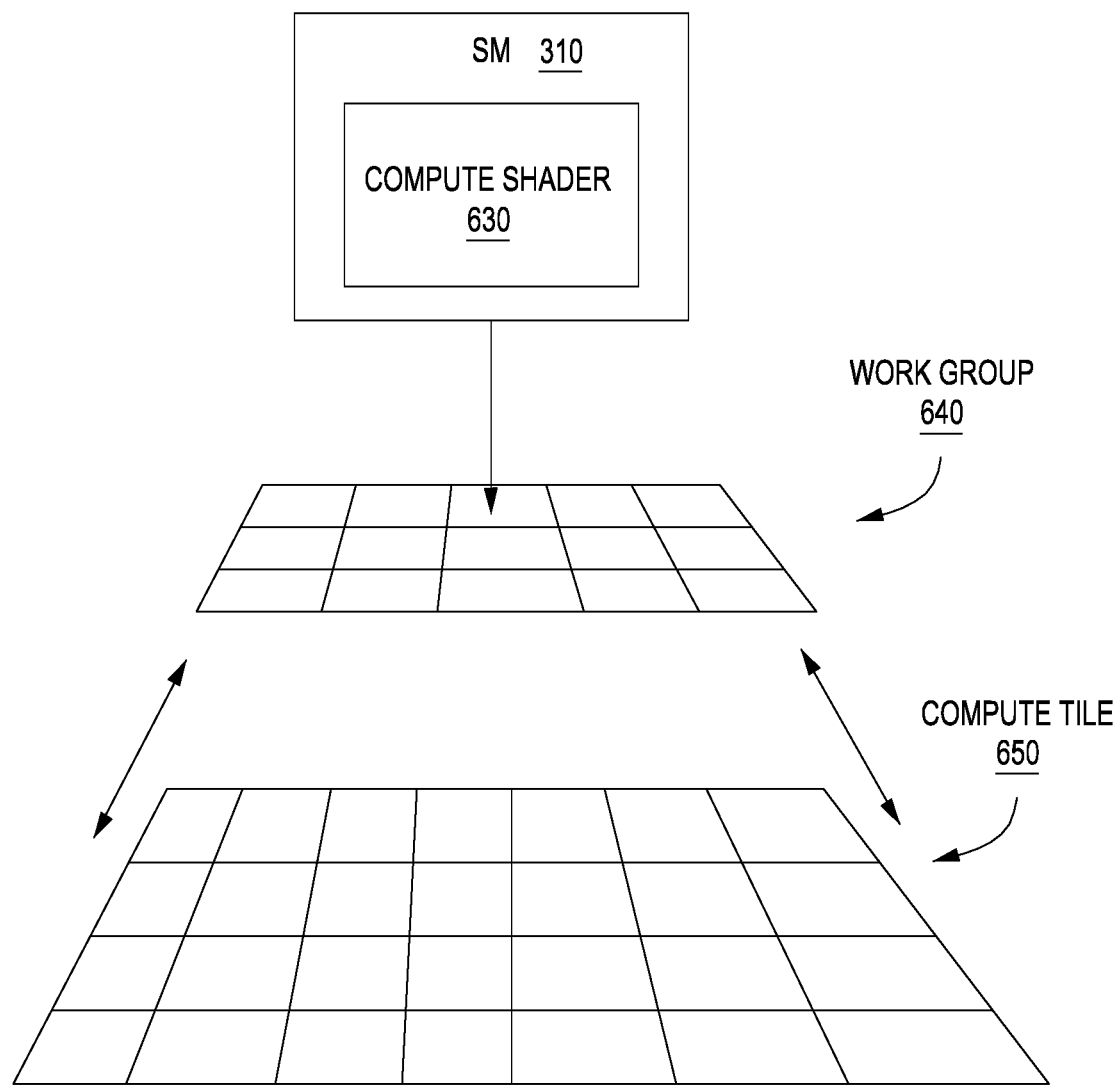
FIG. 6A illustrates an exemplary work group launched when executing a compute shader, according to various embodiments of the present invention.
Figure 6B:
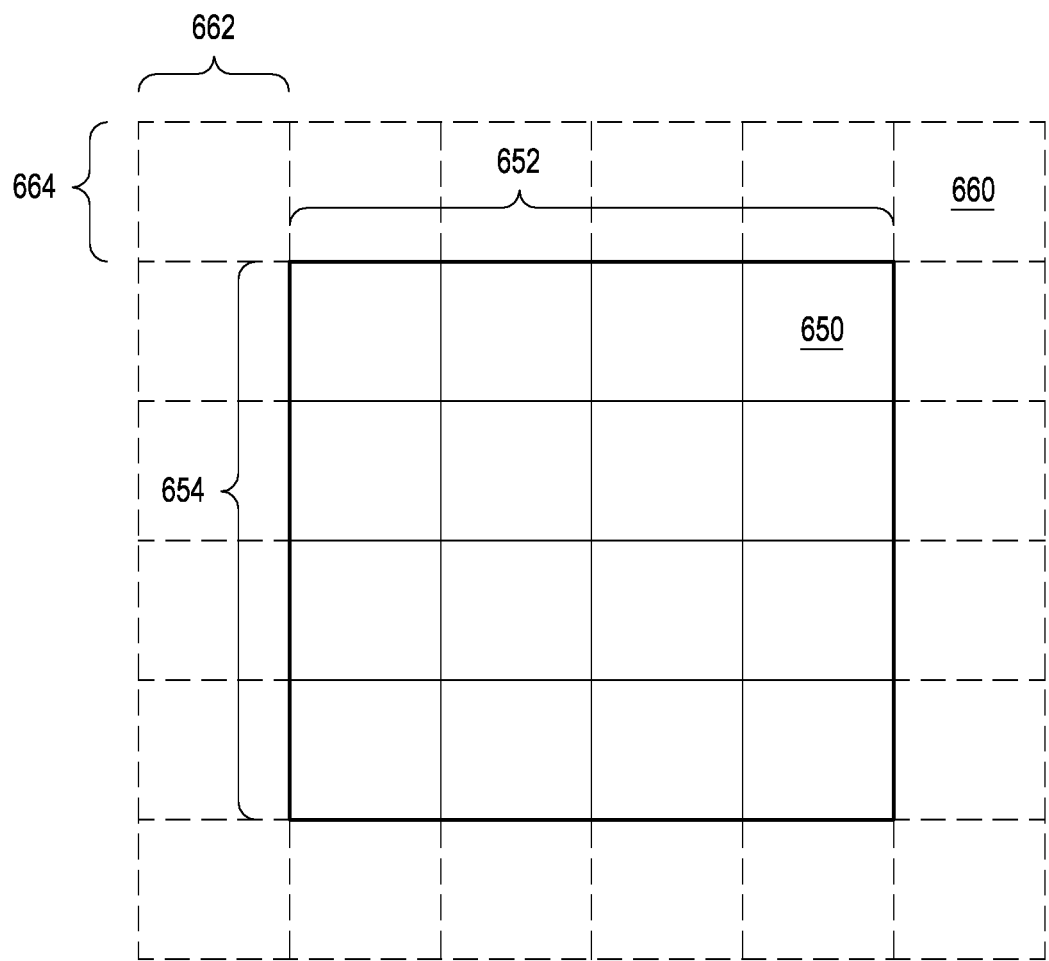
FIG. 6B illustrates the compute tile shown in FIG. 6A in greater detail, according to various embodiments of the present invention.

FIG. 6A illustrates an exemplary work group launched when executing a compute shader, according to various embodiments of the present invention. As shown, SM 310 executes compute shader 630 in order to launch work group 640. Work group 640 includes a plurality of threads that may be arranged with any square or rectangular dimensions. For example, work group 640 could include a 3×5 array of threads or groups of threads. When launched, work group 640 performs processing operations with compute tile 650. In some embodiments, work group 640 has dimensions equal to those associated with compute tile 650. In other embodiments, work group 640 has dimensions that are not equal to those associated with compute tile 650. FIG. 6B illustrates compute tile 650 in greater detail.

FIG. 6B illustrates the compute tile shown in FIG. 6A in greater detail, according to various embodiments of the present invention. As shown, compute tile 650 has width 652 and height 654. Width 652 and height 654 may have the same value or have different values. Compute tile 650 represents an amount of memory that is written during execution of compute shader 630, as described above. As also shown, a filter area 660 surrounds compute tile 650. Filter area 660 represents an additional border of data, beyond that associated with compute tile 650, that is also read in conjunction with the execution of compute shader 630. Filter area 660 is defined based on filter width 662 and filter height 664. Filter width 662 represents the width of pixels beyond one side of compute tile 650 that need to be read. The total width of filter area 660 is equal to width 652+2*filter width 662. Filter height 664 represents the height of pixels beyond one side of compute tile 650 that need to be read. The total height of filter area 660 is equal to height 654+2*filter height 664.

Referring generally to FIGS. 6A-6B, in one embodiment, compute shader 630 is configured to define various operations to be performed with compute tile 650 by threads of work group 640 using relative offsets. For example, when processing a 4×4 compute tile 650, compute shader 630 could configure work group 640 to process pixels having offsets 0 through 3 in an X direction relative to some origin and offsets 0 through 3 in a Y direction relative to the origin. In further embodiments, compute shader 630 may define relative offsets that reference data that resides outside of compute tile 640 by a specific distance in order to read pixels within the outer border or filter area 660. For example, when reading a 6×6 region of memory to render a 4×4 block of pixels, compute shader 630 could configure work group 640 to process pixels having offsets −1 through 4 in the X direction and −1 through 4 in the Y direction.

SM 310 may execute multiple instances of compute shader 630 in order to launch separate instances of work group 640 when processing a cache tile 410. Each instance of work group 640 performs processing operations with a corresponding instance of compute tile 650. Instances of compute tile 650 may be tiled across a two-dimensional region of a cache tile 410. For example, nine 2×2 compute tiles 650 could be tiled across a 6×6 cache tile 410, or nine 5×5 compute tiles 650 could be tiled across a 15×15 cache tile 410. In this manner, a cache tile 410 can be configured to include data written by many compute tiles 650, thereby allowing multiple compute shaders 630 to launch multiple corresponding work groups 640.

In the example described above, however, there is no integer number of 2×2 compute tiles 650 that can tile across a 15×15 cache tile 410, because 15 is not an even multiple of 2. Thus, an important objective when generating cache tile dimensions 520 shown in FIG. 5A is to dimension cache tiles 410 to accommodate compute tiles associated with multiple different dimensions.

To meet this objective, device driver 103 and tiling unit 375 interoperate to generate cache tile dimensions 520 that have specific cache tile heights and widths that are equal to, or proportional to, the corresponding LCMs derived from sub-pass descriptions 536. In this manner, tiling unit 375 generates cache tiles 400 having specific dimensions that can accommodate the potentially different sizes of all compute tiles 650 associated with multi-pass object 510. An example of this technique is described below in conjunction with FIGS. 7A-8D.

Figure 7A:
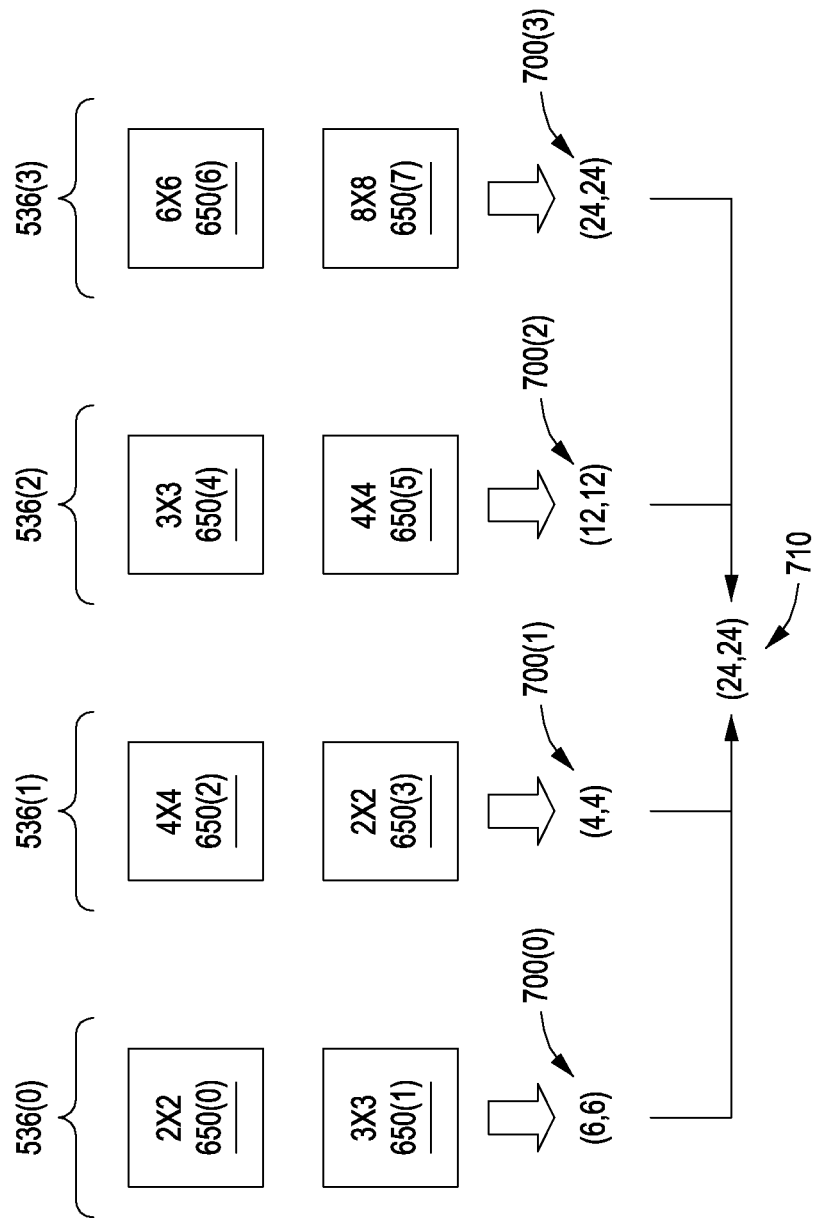
FIG. 7A illustrates exemplary data that is provided by the application of FIG. 1 for generating cache tile dimensions, according to various embodiments of the present invention.

FIG. 7A illustrates exemplary data that is provided by the application of FIG. 1 for generating cache tile dimensions, according to various embodiments of the present invention. As shown, exemplary sub-pass descriptions 536 are associated with data that represents compute tiles 650 having various dimensions. Sub-pass description 536(0) is associated with data that represents a 2×2 compute tile 650(0) and a 3×3 compute tile 650(1). Sub-pass description 536(1) is associated with data that represents a 4×4 compute tile 650(2) and a 2×2 compute tile 650(3). Sub-pass description 536(2) is associated with data that represents a 3×3 compute tile 650(4) and a 4×4 compute tile 650(5). Sub-pass description 536(3) is associated with data that represents a 6×6 compute tile 650(6) and an 8×8 compute tile 650(7). For simplicity, the compute tiles 650 discussed in this example have square dimensions, although persons skilled in the art will understand how the principles discussed below can be applied to compute tiles having rectangular dimensions. As mentioned above in conjunction with FIG. 5B, in some embodiments, sub-pass descriptions 536 need not explicitly include the dimensions of each compute tile, as only the LCMs of those compute tile dimensions may be needed for cache tile dimensioning.

As also shown, each sub-pass description 536 includes sub-pass LCMs 700. The sub-pass LCMs 700 for a given sub-pass description 536 represent the LCM of the height dimensions of the associated compute tiles 650 and the LCM of the width dimensions of the associated compute tiles 650. Because each exemplary compute tile 650 shown is square, the sub-pass LCMs 700 for each sub-pass description have equal width and height. For example, the sub-pass LCMs 700(0) for 2×2 compute tile 650(0) and 3×3 compute tile 650(1) are 6 and 6. Similarly, the sub-pass LCMs 700(1) for 4×4 compute tile 650(2) and 2×2 compute tile 650(3) are 4 and 4. The sub-pass LCMs 700(2) for 3×3 compute tile 650(4) and 4×4 compute tile 650(5) are 12 and 12. The sub-pass LCMs 700(3) for 6×6 compute tile 650(6) and 8×8 compute tile 650(7) are 24 and 24.

Based on the different sub-pass LCMs 700, multi-pass LCMs 710 may be computed to represent the overall height LCM and overall width LCM across all compute tiles 650 associated with multi-pass object 510. Multi-pass LCMs 710, in this example, include a height LCM of 24 and a width LCM of 24. Application 130 may provide multi-pass LCMs 710, or device driver 103 may compute these values in certain cases. Tiling unit 375 generates cache tile dimensions 520 to be even multiples of multi-pass LCMs 710. Thus, all compute tiles 650 associated with multi-pass object 510 fit evenly within cache tiles 410, thereby allowing data associated with each sub-pass 536 to be cached across sub-passes.

In some cases, device driver 103 may implement different cache tile sizes for different sub-passes, yet still permit some degree of tiling across a subset of the sub-passes in a multi-pass. This scenario is described in greater detail by way of example below in conjunction with FIG. 7B.

Figure 7B:
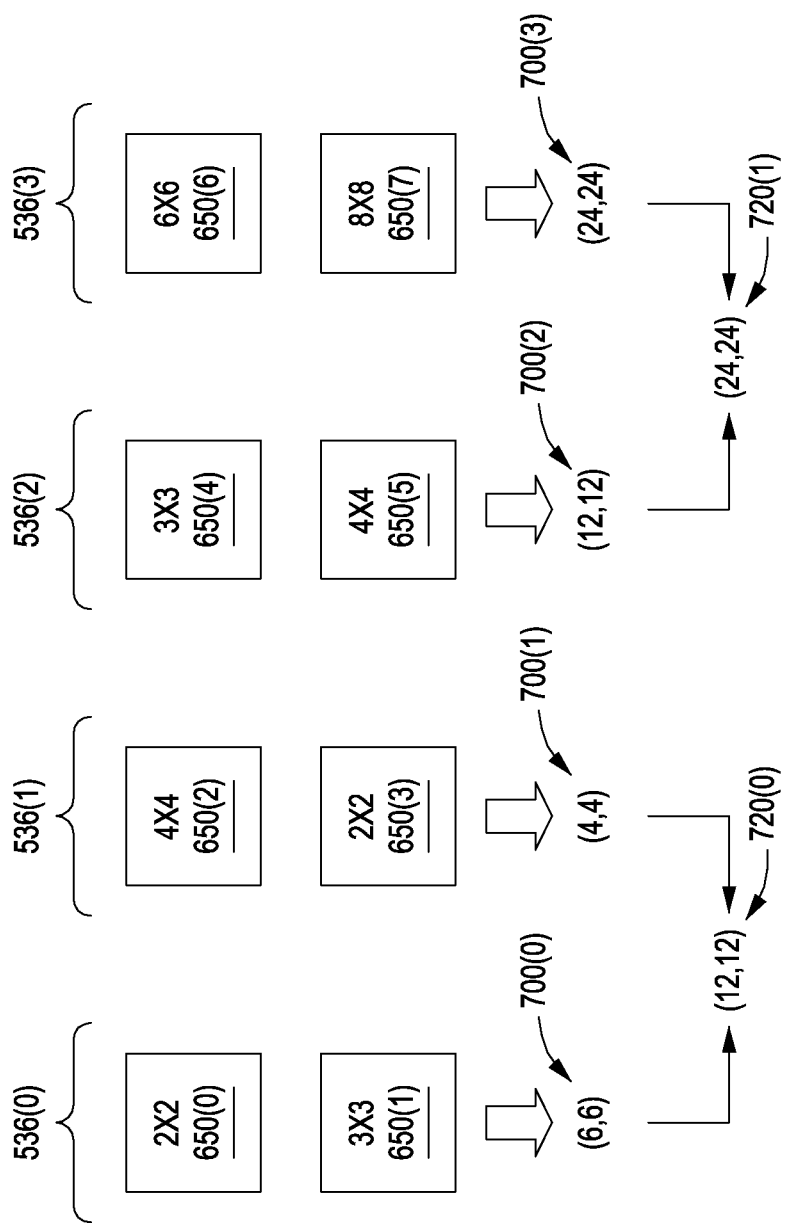
FIG. 7B illustrates exemplary data that is generated by the device driver of FIG. 1 for generating cache tile dimensions, according to various embodiments of the present invention.

FIG. 7B illustrates exemplary data that is generated by the device driver of FIG. 1 for generating cache tile dimensions, according to various embodiments of the present invention. As shown, sub-pass LCMs 700(0) and 700(1) can be processed to generate LCMs 720(0), while sub-pass LCMs 700(2) and 700(3) can be processed to generate LCMs 720(1). LCMs 720(0) represent height and width LCMs for compute tiles associated with sub-pass descriptions 536(0) and 536(1), while LCMs 720(1) represent height and width LCMs for compute tiles associated with sub-pass descriptions 536(2) and 536(3).

Device driver 103 may compute LCMs 720 in the manner described above to allow tiling unit 375 to generate one set of cache tile dimensions 520 for use with the first two sub-passes, and then generate a different set of cache tile dimensions 520 for use with the second two sub-passes. This type of tiling arrangement may be needed when device driver 103 determines that a flush is needed between certain sub-passes in the multi-pass.

FIGS. 8A-8D illustrate an exemplary cache tile dimensioned to accommodate compute tiles having different dimensions, according to various embodiments of the present invention. As shown in each of FIGS. 8A-8D, compute tiles 850(0) through 850(3) have different dimensions. Cache tile 410 has dimensions of 12×12, which can accommodate all compute tiles 850(0) through 850(3). The height and width LCM of the dimensions of compute tiles 850(0) through 850(1) are 12 and 12, respectively. Thus, each of those compute tiles 850 can be evenly distributed across a cache tile 410 having dimensions of 12×12.

Figure 8A:
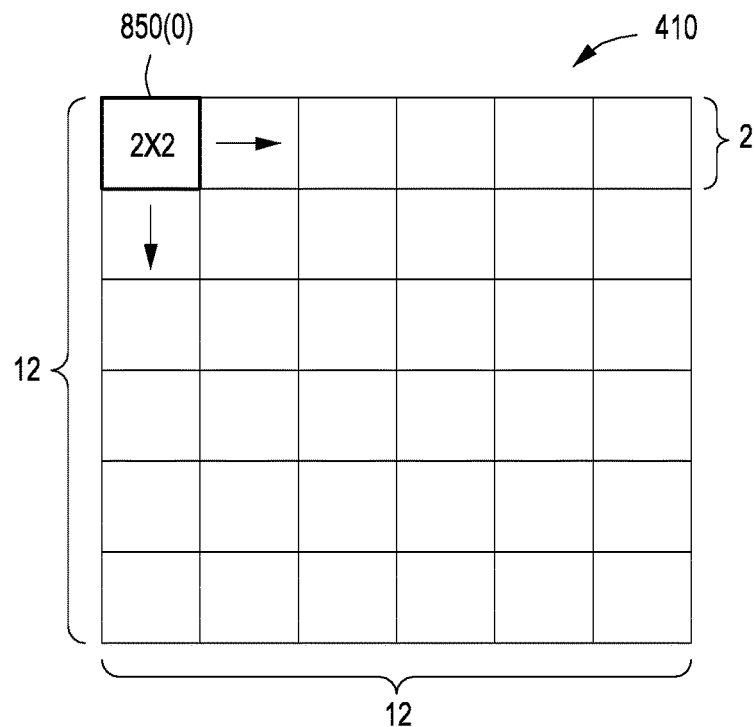
FIGS. 8A-8D illustrate an exemplary cache tile dimensioned to accommodate compute tiles having different dimensions, according to various embodiments of the present invention.
Figure 8B:
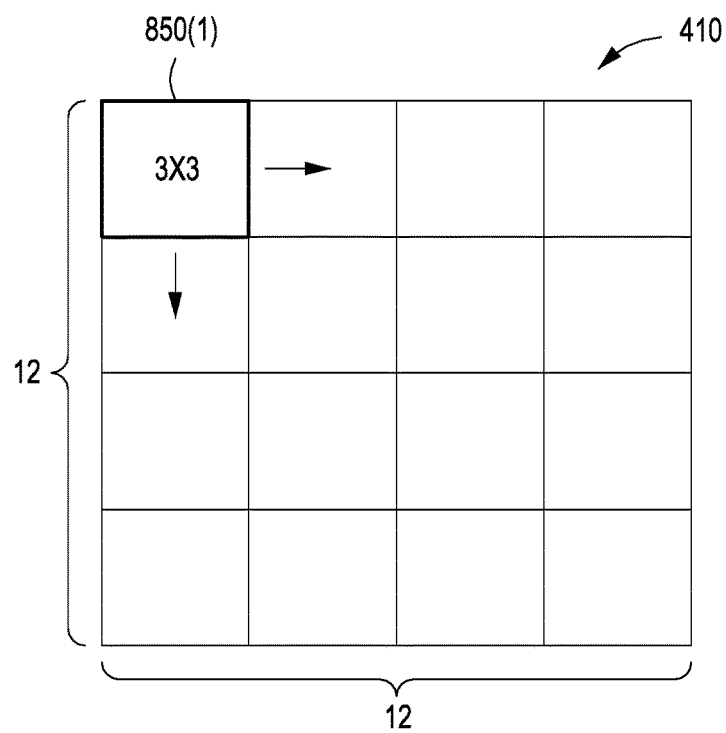
Figure 8C:
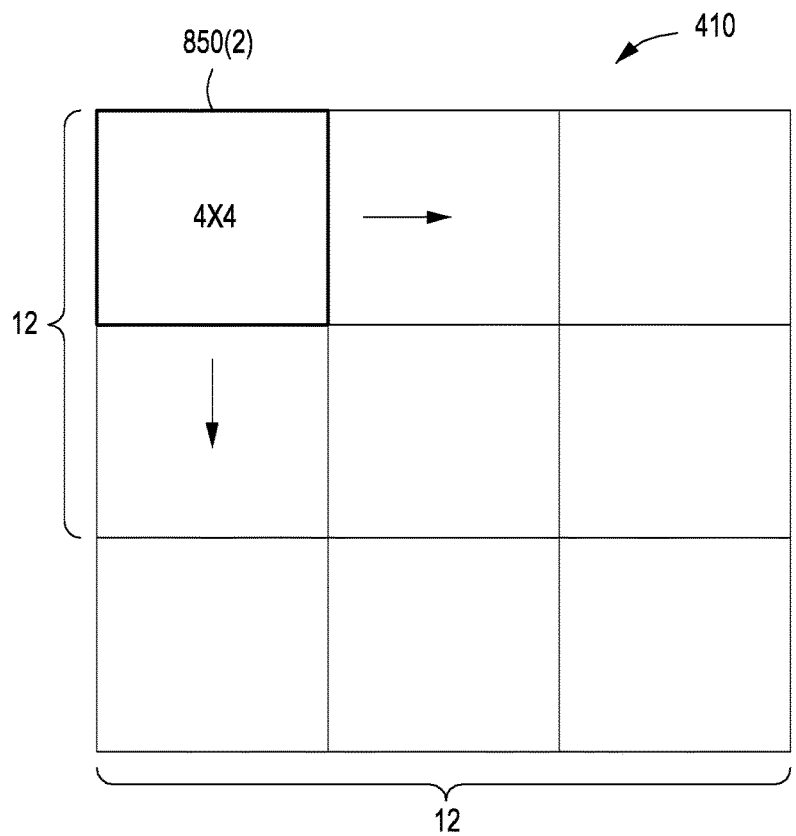
Figure 8D:
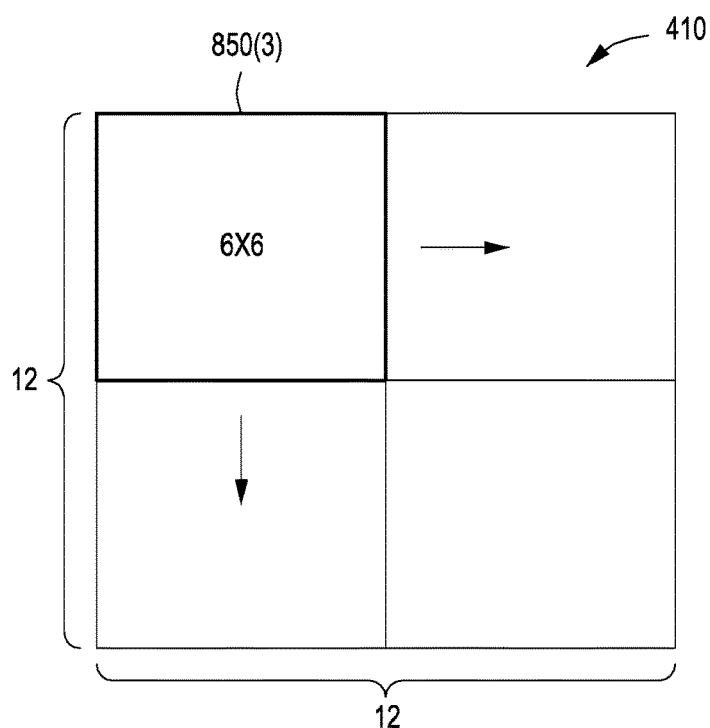
Figure 9:
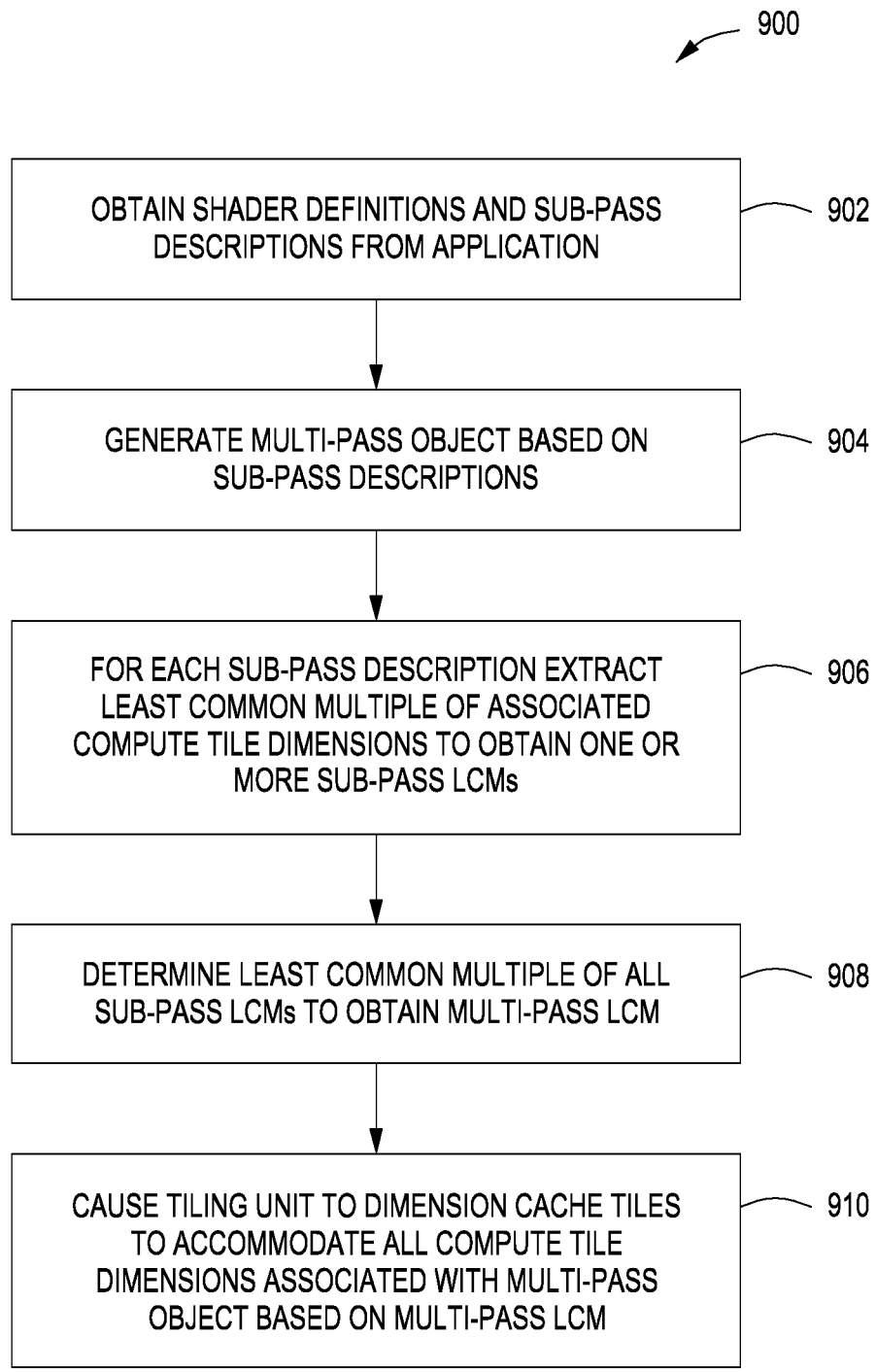
FIG. 9 is a flow diagram of method steps for dimensioning cache tiles to accommodate compute tiles that are processed in one or more multi-pass rendering sub-passes, according to various embodiments of the present invention.

As shown in FIG. 8A, 36 instances of 2×2 compute tile 850(0) can be tiled evenly across cache tile 410. As shown in FIG. 8B, 16 instances of 3×3 compute tile 850(1) can be tiled evenly across cache tile 410. As shown in FIG. 8C, 9 instances of 4×4 compute tile 850(2) can be tiled evenly across cache tile 410. As shown in FIG. 8D, 4 instances of 6×6 compute tile 850(3) can be tiled evenly across cache tile 410.

Referring generally to FIGS. 8A-8D, when SM 310 executes each compute shader associated with compute tiles 850, cache tile 410 includes sufficient space for each of those compute shaders to write data. Thus, once cache tile 410 is generated, additional off-chip memory access operations may not be needed. Compute tiles 850 may all be associated with the same sub-pass, or may be distributed across multiple sub-passes. In embodiments where sub-passes specify graphics shaders to be executed, the LCM values for those sub-passes may be set to one. The above techniques allow tiled caching to be implemented across multiple traversals of screen space pipeline 354. FIG. 9 describes the approaches described thus far in stepwise fashion.

FIG. 9 is a flow diagram of method steps for dimensioning cache tiles to accommodate compute tiles that are processed in one or more multi-pass rendering sub-passes, according to various embodiments of the present invention. Although the method steps are described in conjunction with the systems of FIGS. 1-8, persons skilled in the art will understand that any system configured to perform the method steps, in any order, is within the scope of the present invention.

As shown, a method 900 begins at step 902, where device driver 103 obtains shader definitions 532 and sub-pass descriptions 536 from application 130. Application 130 is a software application that can be executed by CPU 102 to generate graphics for display. A compute shader is a shader program that can be executed by a work group of parallel threads to process data associated with a compute tile. A compute tile has particular dimensions, which are generally independent of dimensions associated with the work group.

At step 904, device driver 103 generates multi-pass object 510 based on sub-pass descriptions 536. Each sub-pass description 512 is a data structure that includes data to be used by graphics processing pipeline 350 to configure graphics processing pipeline 350 for a specific sub-pass. In performing a multi-pass that includes a sequence of sub-passes, graphics processing pipeline 350 generates graphics for display.

At step 906, device driver 103 extracts, from each sub-pass description 536, the least common multiple of the compute tile dimensions associated with the sub-pass 536. In doing so, device driver 103 obtains a sub-pass LCM for each sub-pass description 536.

At step 908, device driver 103 determines the LCM of all sub-pass LCMs to obtain a multi-pass LCM. Device driver 103 may extract this data from sub-pass descriptions 536 or compute this data based on sub-pass descriptions 536. Device driver 103 may also compute different LCMs for different subsets of sub-passes, as described above in conjunction with FIG. 7B. In embodiments with rectangular compute tiles, device driver 103 may determine the LCM of all width dimensions for the compute tiles associated with multi-pass object 510, and then determine the LCM of all height dimensions for the compute tiles associated with multi-pass object 510.

At step 910, device driver 103 causes tiling unit 375 to dimension cache tiles 400 to accommodate all compute tile dimensions associated with multi-pass object 510 based on the multi-pass LCM generated at step 908. In this manner, tiling unit 375 generates cache tiles 400 having specific dimensions that can accommodate the potentially different sizes of all compute tiles associated with multi-pass object 510.

In sum, a device driver is configured to identify a group of compute shaders to be executed in multiple traversals of a graphics processing pipeline. Each such compute shader accesses a compute tile of data having particular dimensions. The device driver interoperates with a tiling unit to determine dimensions for a cache tile so that an integer multiple of each compute tile will fit evenly within the cache tile. Thus, when executing compute shaders in different traversals of the graphics processing pipeline, the data processed by those compute shaders can be cached in the cache tile between passes.

At least one advantage of the disclosed technique is that it allows tiled caching to be implemented in the context of multi-pass rendering. Accordingly, the need to perform off-chip memory access operations between traversals of the graphics processing pipeline can be reduced, which may improve memory bandwidth utilization and increase overall system performance.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable medium storing program instructions that, when executed by a processor, cause the processor to generate cache tiles by performing the steps of:
   receiving a first dimension associated with a first compute tile that represents a first region of a first memory accessed by a first shader program during execution;
   receiving a second dimension associated with a second compute tile that represents a second region of the first memory to be accessed by a second shader program during execution; and
   executing one or more tiling operations to assign dimensions to a first cache tile based on the first dimension and the second dimension, wherein the first cache tile resides within a second memory comprising an on-chip cache memory and stores data associated with the first region and the second region of the first memory, wherein the first shader program and the second shader program are executed during a rendering operation that involves multiple passes through a graphics processing pipeline.

2. The non-transitory computer-readable medium of claim 1, wherein the first shader program and the second shader program are executed during a first sub-pass of the rendering operation.

3. The non-transitory computer-readable medium of claim 1, wherein the first shader program is executed during a first sub-pass of the rendering operation, and the second shader program is executed during a second sub-pass of the rendering operation.

4. The non-transitory computer-readable medium of claim 1, wherein executing the one or more tiling operations to assign dimensions to the first cache tile are performed based on a least common multiple of the first dimension and the second dimension.

5. The non-transitory computer-readable medium of claim 1, wherein at least one dimension of the first cache tile is a multiple of both the first dimension and the second dimension.

6. The non-transitory computer-readable medium of claim 1, further comprising:
   generating a multi-pass object based on a sub-pass description associated with at least one of the first shader program and the second shader program; and
   configuring a graphics processing pipeline to perform multiple sub-passes based on the multi-pass object.

7. The non-transitory computer-readable medium of claim 1, wherein the first shader program comprises a compute shader that, when processing a first pixel, is configured to access data associated with one or more pixels neighboring the first pixel, and wherein the one or more pixels reside outside of the first compute tile within a region that is bounded by a filter width or a filter height.

8. The non-transitory computer-readable medium of claim 1, wherein the first shader program, when executed, is configured to launch a first work group of threads having a first work group dimension.

9. The non-transitory computer-readable medium of claim 8, wherein the first work group dimension is equal to the first dimension of the first compute tile.

10. The non-transitory computer-readable medium of claim 8, wherein the first work group dimension is less than the first dimension.

11. The non-transitory computer-readable medium of claim 1, wherein the first shader program is configured to access the first compute tile based on a set of coordinates defined relative to a location within the first compute tile.

12. A system configured to generate cache tiles, comprising:
   a memory storing a driver application; and
   a processor coupled to the memory that, when executing the driver application, is configured to:
      receive a first dimension associated with a first compute tile that represents a first region of a first memory accessed by a first shader program during execution;
      receive a second dimension associated with a second compute tile that represents a second region of the first memory to be accessed by a second shader program during execution; and
      execute one or more tiling operations to assign dimensions to a first cache tile based on the first dimension and the second dimension, wherein the first cache tile resides within a second memory comprising an on-chip cache memory and stores data associated with the first region and the second region of the first memory, wherein the first shader program and the second shader program are executed during a rendering operation that involves multiple passes through a graphics processing pipeline.

13. The system of claim 12, wherein the first shader program and the second shader program are executed during a first sub-pass of the rendering operation.

14. The system of claim 12, wherein the first shader program is executed during a first sub-pass of the rendering operation, and the second shader program is executed during a second sub-pass of the rendering operation.

15. The system of claim 12, wherein the processor is configured to execute the one or more tiling operations to assign dimensions to the first cache tile based on a least common multiple of the first dimension and the second dimension.

16. The system of claim 12, wherein at least one dimension of the first cache tile is a multiple of both the first dimension and the second dimension.

17. The system of claim 12, wherein the processor is further configured to:
   generate a multi-pass object based on a sub-pass description for at least one of the first shader program and the second shader program; and
   configure a graphics processing pipeline to perform multiple sub-passes based on the multi-pass object.

18. A computer-implemented method for generating cache tiles, the method comprising:
   receiving a first dimension associated with a first compute tile that represents a first region of a first memory accessed by a first shader program during execution;
   receiving a second dimension associated with a second compute tile that represents a second region of the first memory to be accessed by a second shader program during execution; and
   executing one or more tiling operations to assign dimensions to a first cache tile based on the first dimension and the second dimension, wherein the first cache tile resides within a second memory comprising an on-chip cache memory and stores data associated with the first region and the second region of the first memory, wherein the first shader program and the second shader program are executed during a rendering operation that involves multiple passes through a graphics processing pipeline.

19. The non-transitory computer-readable medium of claim 1, further comprising receiving a third dimension associated with the first compute tile, wherein the third dimension comprises a height or width of the pixel array associated with the first compute tile.

20. The non-transitory computer-readable medium of claim 19, wherein executing the one or more tiling operations comprises executing the one or more tiling operations to assign dimensions to the first cache tile further based on the third dimension.

21. The non-transitory computer-readable medium of claim 19, wherein the first dimension is equal to the third dimension.

22. The non-transitory computer-readable medium of claim 19, wherein the first dimension is not equal to the third dimension.

23. A non-transitory computer-readable medium storing program instructions that, when executed by a processor, cause the processor to generate cache tiles by performing the steps of:
   receiving a first dimension associated with a first compute tile that represents a first region of a first memory accessed by a first shader program during execution, wherein the first dimension comprises a height or width of a pixel array associated with the first compute tile;
   receiving a second dimension associated with a second compute tile that represents a second region of the first memory to be accessed by a second shader program during execution; and
   executing one or more tiling operations to assign dimensions to a first cache tile based on the first dimension, the second dimension, and a least common multiple of the first dimension and the second dimension, wherein the first cache tile resides within a second memory comprising an on-chip cache memory and stores data associated with the first region and the second region of the first memory.

24. A system configured to generate cache tiles, comprising:
   a memory storing a driver application; and
   a processor coupled to the memory that, when executing the driver application, is configured to:
      receive a first dimension associated with a first compute tile that represents a first region of a first memory accessed by a first shader program during execution, wherein the first dimension comprises a height or width of a pixel array associated with the first compute tile;
      receive a second dimension associated with a second compute tile that represents a second region of the first memory to be accessed by a second shader program during execution; and
      execute one or more tiling operations to assign dimensions to a first cache tile based on the first dimension, the second dimension, and a least common multiple of the first dimension and the second dimension, wherein the first cache tile resides within a second memory comprising an on-chip cache memory and stores data associated with the first region and the second region of the first memory.

25. A computer-implemented method for generating cache tiles, the method comprising:
   receiving a first dimension associated with a first compute tile that represents a first region of a first memory accessed by a first shader program during execution, wherein the first dimension comprises a height or width of a pixel array associated with the first compute tile;

receiving a second dimension associated with a second compute tile that represents a second region of the first memory to be accessed by a second shader program during execution; and executing one or more tiling operations to assign dimensions to a first cache tile based on the first dimension, the second dimension, and a least common multiple of the first dimension and the second dimension, wherein the first cache tile resides within a second memory comprising an on-chip cache memory and stores data associated with the first region and the second region of the first memory.

* * * * *